United States Patent [19]

Severin

[11] 4,154,122

[45] May 15, 1979

[54] HAND-POWERED TOOL

[76] Inventor: Hubert J. Severin, Beacon Rd., Bethany, Conn. 06525

[21] Appl. No.: 833,737

[22] Filed: Sep. 16, 1977

[51] Int. Cl.[2] .................................... F16H 27/02

[52] U.S. Cl. .................................... 74/142; 74/21; 81/63.1; 408/126

[58] Field of Search .................... 74/21, 142, 347, 118, 74/167; 408/126; 173/163, 30; 366/129, 283, 4, 342, 3; 81/57.26, 57.27, 57.28, 57.29, 57.30, 57.31, 57.39, 58.1, 63.1

[56] References Cited

U.S. PATENT DOCUMENTS

| | | | |
|---|---|---|---|
| 613,283 | 11/1898 | Krane | 81/57.39 |
| 802,358 | 10/1905 | Merrell | 74/142 |
| 940,342 | 11/1909 | Milne | 74/347 |
| 1,623,696 | 4/1927 | Nugent | 74/21 |
| 3,003,359 | 10/1961 | Maasdam | 74/167 |
| 3,035,451 | 5/1962 | O'Connell | 81/57.31 |
| 3,756,090 | 9/1973 | Mella | 173/163 |

FOREIGN PATENT DOCUMENTS

| | | | |
|---|---|---|---|
| 961681 | 11/1949 | France | 74/142 |

*Primary Examiner*—Samuel Scott
*Assistant Examiner*—George Anderson
*Attorney, Agent, or Firm*—St. Onge, Stewart, Johnston, Reens & Noe

[57] ABSTRACT

A hand-powered tool in which a spindle for driving a tool attachment is driven by a bevel gear. The spindle is supported in bearings on both sides of the bevel gear and extends through an opening in a stationary transverse shaft on which the bevel gear is journaled. Two pinions fixed to the spindle on opposite sides of the transverse shaft are moved into and out of meshing engagement with the bevel gear by shifting the spindle longitudinally in order to reverse the direction of rotation of the spindle.

7 Claims, 4 Drawing Figures

HAND-POWERED TOOL

BACKGROUND OF THE INVENTION

This invention relates to rotary hand tools, and it relates more particularly to lever-operated hand-powered tools for driving or removing screws, nuts or bolts and the like.

Numerous hand-powered tools have been devised heretofore, such as the spiral ratchet tools currently available. In this type of tool, it is necessary to apply the driving force for rotating the spindle in a direction lengthwise of its axis. Such an arrangement requires more space to operate than is available in many situations where the tool might be used, and is sometimes awkward to handle, especially where the tool is used for removing screws when the driving force along the length of the spindle tends to press the screw into place instead of removing it. Such tools also require two hands to operate, and the forces exerted are not efficiently applied.

A pistol-grip type of hand-powered tool, on the other hand, is more adaptable to the human hand because only the squeeze of the fingers is utilized to rotate the spindle, while the desired amount of pressure for forcing the screw or other fastener into place is applied with the palm of the hand on the grip of the tool independently of the force required to rotate the spindle. U.S. Pat. No. 3,035,451 to O'Connell et al discloses a pistol-grip type of hand-powered rotary tool in which the direction of rotation of the spindle is reversed by shifting the pinion on the spindle laterally into engagement with one or the other of a pair of beveled gears located on opposite sides of the pinion. A similar type of bevel-gear drive is disclosed in U.S. Pat. No. 3,132,549 to Lee, but in this case the two bevel gears are alternatively shifted into engagement with the pinion on the spindle for reversing its direction of rotation. The difficulty with both these bevelgear mechanisms is that in order to reverse the spindle, it is necessary either to shift the pinion gear and spindle laterally into engagement with one of a pair of bevel gears, or to shift the bevel gears into engagement with the pinion gear. In both cases, the spindle can be mounted only at one end of the housing for the tool. Furthermore, in the case where the spindle must be moved laterally, the mounting therefor is complicated and is characteristically unreliable.

It is an object of the present invention to provide a simple hand-grip tool with a bevel-gear drive and spindle-reversing mechanism, in which both the spindle and bevel-drive gear are sturdily mounted in the housing of the tool for smooth reliable operation.

SUMMARY OF THE INVENTION

The invention resides basically in the concept of extending the spindle for a gear-driven rotary hand tool through an opening provided in a non-rotatable shaft on which the drive gear is journaled. In this way, the spindle can be mounted in bearings at both ends of the housing for the tool in order to provide as much support as possible. At the same time the shaft for the drive gear can also be solidly supported at both ends in opposite side walls of the housing. A pair of pinion gears are provided on the spindle for rotation therewith and for alternate meshing engagement of one or the other with the drive gear at opposite points on the periphery thereof, depending on the direction in which it is desired to rotate the spindle. Suitable means are provided for rotating the drive gear in one direction only, such means comprising, for example, a pawl and ratchet arrangement which is actuated by a finger-lever.

The tool is also provided with means for shifting the pinion gears into and out of mesh with the drive gear and for locking them in position for the desired direction of rotation of the spindle. Where the spindle is movable lengthwise, such means may consist for example of a yoke or shoe that straddles one of the pinion gears and is connected to a thumb-lever on the outside of the housing so that the spindle can be moved lengthwise in one direction or the other until one or the other pinion gear engages the drive gear.

DETAILED DESCRIPTION OF PREFERRED EMBODIMENT OF THE INVENTION

Other objects and advantages of the invention will be more apparent from the description of one embodiment shown in the accompanying drawings, wherein FIG. 1 is a side elevational view of a rotary handpowered tool in accordance with the invention, with the housing therefor partially broken away in order to expose the drive gears;

Figure 1:
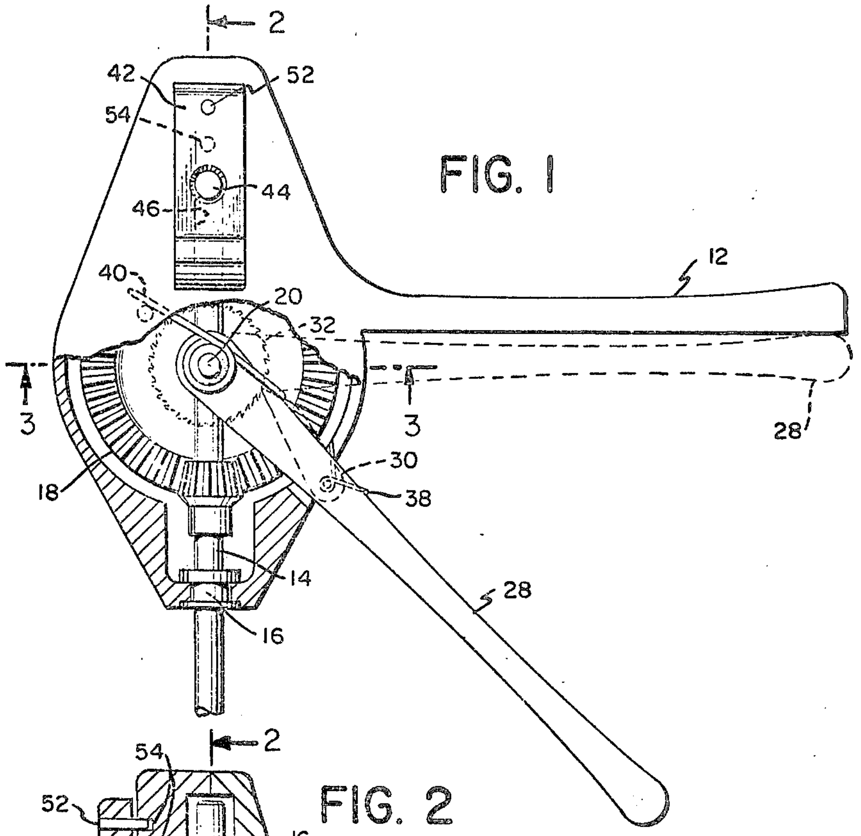

The tool of the present invention is provided with a two-piece housing 10 having a depending handle or grip 12 formed integrally therewith. A spindle 14 is rotatably supported within housing 10 in a pair of bearings 16 located at opposite ends of the housing. One end of spindle 14 extends out of the housing and is provided with a chuck (not shown) by which a screw driver, socket wrench or other tool attachment is fixed to it. A beleved drive gear 18 is journaled on a fixed transverse shaft 20 supported at both ends in opposite side walls of housing 10. As best seen in FIGS. 2 and 3, shaft 20 and spindle 14 intersect, shaft 20 being provided with an opening 22 through which spindle 14 extends. Fixed to spindle 14 for rotation therewith, is a pair of beveled pinion gears 24, 26 disposed on opposite sides of shaft 20. Spindle 14 is not only rotatable, but is also movable longitudinally in bearings 16 so that either pinion gear 24 or 26 can be shifted into meshing engagement with bevel gear 18, while the other is being simultaneously disengaged therefrom. Since pinion gears 24 and 26 engage bevel gear 18 at diametrically opposite points on its periphery, rotation of bevel gear 18 in one direction (e.g. counterclockwise as viewed in FIG. 1) will rotate spindle 14 in one direction when pinion 24 meshes with gear 18, and in the opposite direction when pinion 26 meshes with gear 18.

Figure 3:
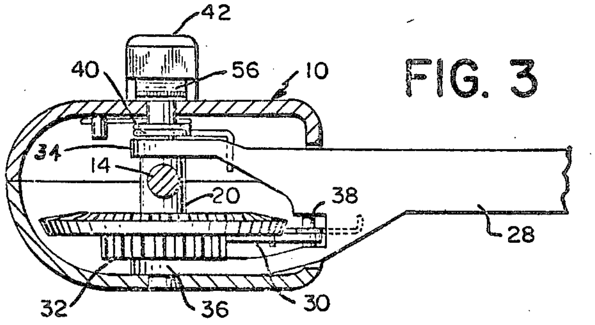
FIG. 3 is another cross-sectional view taken on the line 3—3 of FIG. 1, with the finger-lever in its closed or retracted position.
Figure 4:
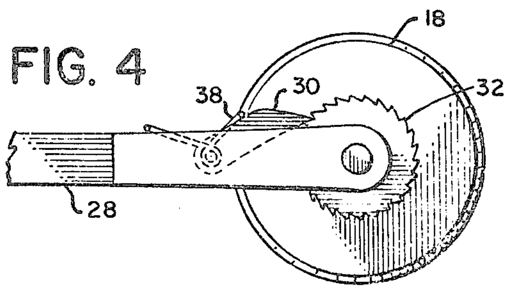
FIG. 4 is a detail view of the driving ratchet for the bevel gear.

Bevel gear 18 is driven by a finger-lever 28, which is pivotally mounted on shaft 20, and is provided with a springloaded pawl 30 (FIGS. 3 and 4), which engages a ratchet wheel 32 integral with gear 18. Finger-lever 28 is bifurcated at its inner end to form a pair of arms 34, 36 which are freely pivoted on shaft 20 adjacent opposite ends thereof so that they span both the bevel gear 18 and spindle 14. Pawl 30 is urged by a spring 38 into constant engagement with the teeth of wheel 32, so that when finger-lever 28 is drawn toward handle 12 from the full-line to the phantom-line positions shown in FIG. 1, bevel gear 18 is driven in a counterclockwise direction (or clockwise as shown in FIG. 4); but when it is moved back to its initial, full-line position, pawl 30 simply slides across the teeth of wheel 32 without rotating gear 18. A torsion spring 40 is provided for returning finger-lever 28 to its open or full-line position, the central mounting coils of spring 40 encircling the transverse shaft 20, while one end of the spring engages a fixed pin in the side wall of housing 10 and the other end constantly presses against the arm 34 of finger-lever 28.

It will be apparent from the foregoing that by holding the tool in one hand with the handle 12 against the palm of the hand and the fingers engaging the finger-lever 28, the spindle can be rapidly rotated, using either long or short strokes of the finger-lever. Due to the length of finger-lever 28 and the size of bevel gear 18 as compared to that of the pinion gears 24 and 26, a substantial torque can be applied by spindle 14 for tightening or loosening screws and the like.

Figure 2:
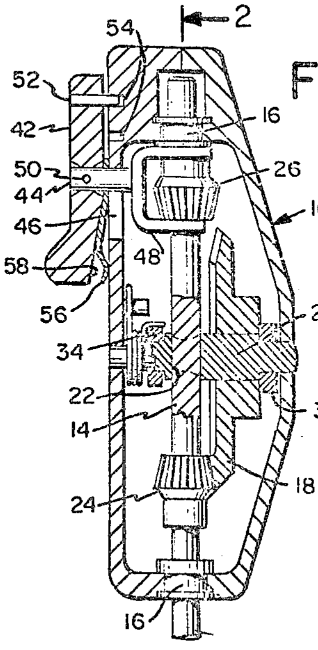
FIG. 2 is a cross-sectional view thereof taken on the line 2—2 of FIG. 1.

In order to reverse its direction of rotation, spindle 14 is moved forward longitudinally from the position shown in FIGS. 1 and 2, thereby disengaging pinion 24 from bevel gear 18 and simultaneously moving pinion 26 into driving engagement therewith at a point diametrically opposite the point of engagement of pinion 24. This is accomplished in this instance by means of a thumb-lever 42 on the outside of housing 10. Thumb-lever 42 has a shaft 44, which extends through an elongated slot 46 in housing 10 and has a U-shaped shoe 48 at its inner end. The two legs of shoe 48 span the pinion 26 and are each provided with an opening through which spindle 14 extends. The legs of shoe 48 fit close to, and in bearing engagement with, the opposite ends of the sleeve portion of pinion 26, so that when thumb-lever 42 is moved along slot 46, which is parallel with spindle 14, the spindle assembly (including pinions 24 and 26) is moved lontigudinally in order to operatively engage one or the other of pinions with bevel gear 18.

Spindle 14 is locked in each of its operating positions by the thumb-lever 42, which is connected to shaft 44 by a pin 50, permitting limited pivotal movement of thumb-lever 42 with respect to the housing 10. An inwardly projecting locking pin 52 is rigidly fixed in one end of thumb-lever 42 for engagement within one of two recesses 54, 54 in the side of housing 10. A leaf-spring 56 is fixed to an outwardly inclinded inner wall 58 at the other end of thumb-lever 42 from pin 52 for urging thumb-lever 42 clockwise (as viewed in FIG. 2) about pivot pin 50. Locking pin 52 is therefore urged by spring 56 into engagement within one or the other of recesses 54. By pressing thumb-lever 42 inwardly against the pressure of spring 56, the opposite end of lever 42 is moved outward withdrawing locking pin 52 from one of the recesses so that lever 42 and spindle 14 can be shifted to the other operating position of the spindle, at which point the locking pin 52 is re-engaged with the other recess 54 by spring 56.

It will be noted that during the power stroke of the finger-lever 28 of the tool shown in the drawing, the spindle 14 is rotated, in a clockwise direction as viewed from the rear when the pinion gear 24 meshes with the drive gear 18 in order to tighten a screw or bolt having a right-hand thread. In this position the pinion gear 26 is located out of engagement with drive gear 18, and the rear leg of the shoe 48 rests against the end of the rear bearing 16. The end of this bearing thus forms an abutment surface on the housing for receiving the force exerted longitudinally of the spindle as the tool is pressed against the fastener that is being tightened. Accordingly, the longitudinal thrust on the spindle is taken directly by the housing, rather than indirectly through the thumb-lever 42, thereby providing a much sturdier and more reliable construction.

On the other hand, when the direction of rotation of spindle 14 is reversed for loosening such a fastener by moving the spindle forward until pinion gear 26 meshes with drive gear 18, for force exerted longitudinally of spindle 14 as the tool is pressed against the fastener is considerably less than that required when the tool is being used for tightening. Consequently, in the position for reverse rotation, the locking pin 52 on thumb-lever 42 is adequate for purposes of holding spindle 14 in place without fear of shifting the pinion gear 26 out of meshing engagement with the drive gear 18.

From the foregoing it will be apparent that the hand-powered tool of the present invention is provided with a mechanically simple driving mechanism, which is capable of producing a substantial torque. Smooth, reliable operation is assured by supporting the shaft for the drive gear, as well as the spindle, on both sides of the drive gear and at the same time making the spindle reversible simply by shifting it longitudinally.

What is claimed is:

1. A hand-powered rotary tool having a housing, a spindle rotatably mounted within said housing at opposite ends thereof, one end of said spindle extending through said housing for rotating a tool attachment at said one end, a non-rotating shaft mounted at both ends in opposite sides of said housing transversely of said spindle and having an opening through which said spindle extends, a drive gear rotatably mounted on said shaft, means for rotating said drive gear in one direction only, a pair of pinion gears secured to said spindle for rotation therewith, said pinion gears being disposed on opposite sides of said shaft and movable in unison along the longitudinal axis of said spindle into alternative operating positions in which one of said pinion gears meshes with said drive gear such that when said pinion gears are moved in one direction along said axis, one of said pinion gears is shifted into meshing engagement with said drive gear at one point along its periphery for rotating said spindle in one direction while the other of said gears is disengaged from said drive gear, and when said pinion gears are moved in the other direction axially of said spindle, said one pinion gear is disengaged from said drive gear while said other pinion gear is shifted into meshing engagement with said drive gear at a point diametrically opposite said one point in order to rotate said spindle in the opposite direction, and means for shifting said pinion gears along said axis into and out of mesh with said drive gear and for locking them in each of said operating positions.

2. A hand-powered tool as defined in claim 1, wherein said drive and pinion gears are beveled and which further includes a handle rigidly mounted on said housing, said means for rotating said drive gear comprising a finger-lever pivoted on said transverse shaft for movement to and from said handle and a ratchet device interposed between said finger-lever and said drive gear.

3. A hand-powered tool as defined in claim 2, wherein said spindle is mounted for limited longitudinal movement as well as for rotation and said pinion gears are rigidly mounted on said spindle in spaced relation to each other for movement in unison therewith into and out of mesh with said drive gear.

4. A hand-powered tool as defined in claim 3, wherein said drive gear, said means for rotating the same and said one pinion gear are arranged such that said spindle is rotated in a direction for tightening a threaded fastener, said one pinion gear being disposed such that it meshes with said drive gear when said spindle is shifted rearwardly of said housing, said housing having provision for positively limiting such rearward longitudinal movement of said spindle when said one pinion gear is in meshing engagement with said drive gear, whereby the force exerted longitudinally of said spindle when said tool is pressed against said fastener while tightening it is transmitted directly to said housing.

5. A hand-powered tool as defined in claim 3, wherein said means for shifting and locking said spindle comprises a thumb-lever disposed outside said housing and having a shoe connected to said spindle for moving it longitudinally.

6. A hand-powered tool as defined in claim 5, wherein said thumb-lever is movably connected to said shoe and has a locking member disposed for locking engagement within one of two spaced recesses in said housing corresponding to each operating position of said spindle, and means for urging said thumb-lever in a direction for engaging said locking member in one of said recesses.

7. A hand-powered tool as defined in claim 5, wherein said shoe is a U-shaped member having its legs disposed on opposite sides of one of said pinion gears for bearing engagement with the ends thereof.

* * * * *